United States Patent
Kermani (10) Patent No.: US 6,826,143 B1
(45) Date of Patent: Nov. 30, 2004

(54) MULTI-DIMENSIONAL OPTICAL DISK

(75) Inventor: Bahram Ghaffarzadeh Kermani, Whitehall, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/482,960

(22) Filed: Jan. 14, 2000

(51) Int. Cl.[7] .................................................. G11B 7/00
(52) U.S. Cl. .................. 369/275.1; 369/47.1; 369/53.1; 369/59.1
(58) Field of Search ............................... 369/47.1, 53.1, 369/59.1, 103, 109.01, 110.01, 110.03, 112.01, 275.1, 275.3, 275.4

(56) References Cited

U.S. PATENT DOCUMENTS

| | | |
|---|---|---|
| 5,357,499 A | 10/1994 | Nomoto |
| 5,359,591 A | 10/1994 | Nomoto |
| 5,408,456 A | 4/1995 | Hosoya |
| 5,453,969 A | 9/1995 | Psaltis et al. |
| 5,471,455 A | 11/1995 | Jabr |
| 5,559,787 A | 9/1996 | Nomoto |
| 5,572,508 A | 11/1996 | Satoh et al. |
| 5,577,016 A | 11/1996 | Inagaki et al. |
| 5,696,758 A | 12/1997 | Yanagimachi et al. |
| 5,724,339 A | 3/1998 | Ogawa |
| 5,923,634 A | 7/1999 | Stone, Jr. |
| 5,995,481 A | 11/1999 | Mecca |

OTHER PUBLICATIONS

European Search Report, Oct. 9, 2002.

*Primary Examiner*—Muhammad Edun (57) ABSTRACT

The present invention provides an optical disk with pits and/or bumps which each contain a plurality of facets. Each facet of each pit and/or bump is intended for separate read back as an individual 'side' of the optical disk (much as vinyl records had two 'sides' for separate playback). The separate 'sides' of the optical disk formed by separate facets of each pit and/or bump can be read back either simultaneously or serially, either by a corresponding plurality of laser beams, or by a common laser beam which is positioned to a first orientation with respect to a rotating track to focus on a first set of facets of each pit and/or bump, and then repositioned to focus on a second set of facets of the same set of pits and/or bumps and thus to read a second 'side' of the optical disk. The technique may be extended to provide a single optical disk and even a single track of the optical disk with even more than two 'sides' by using three-, four- or five-sided pyramidal-shaped pits and/or bumps.

28 Claims, 8 Drawing Sheets

MULTI-DIMENSIONAL OPTICAL DISK

BACKGROUND OF THE INVENTION

1. Field of the Invention

This invention relates generally to optical disks. More particularly, it relates to a technique and method for achieving higher density data storage in an optical disk such as a compact disk (CD) or digital video disk (DVD).

2. Background of Related Art

Conventional optical disk players (e.g., a CD ROM player, music CD player, DVD player, etc.) contain data bits within pits and/or bumps formed along tracks in the surface of one side of an optical disk (e.g., a compact disk (CD) or digital video disk (DVD). In these conventional systems, the traveling distance of a laser beam is changed in accordance with a the presence or absence of a pit in certain technologies, and/or the presence of a bump using other technologies.

Figure 7:
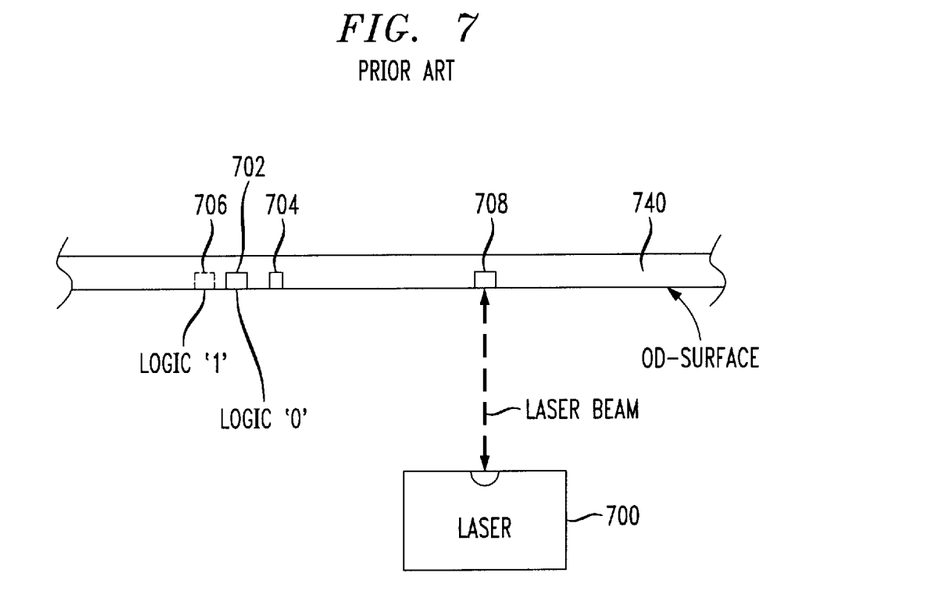
FIG. 7 shows a cross sectional view of a conventional optical disk containing a series of pits along a track path.

FIG. 7 shows a cross sectional view of a conventional optical disk 740 containing a series of pits 702, 704, 706, 708 along a track path.

In particular, in FIG. 7, a plurality of pits 702–708 are presented one-by-one to a focal point of a laser beam. The laser 700 outputs a particular laser beam, e.g., 780 nm laser beam, and senses the distance to a reflection point of the laser beam upon its return back to the laser 700. If the pit 702–708 is a deep pit, e.g., as shown in pits 702, 704 and 708, the data point is determined to be of a particular logic level (e.g., a logic '0'). Conversely, if the pit is either non-existent at a data point, or of another depth, as shown in pit 706, the data point is determined to be of the opposite logic level (e.g., a logic '1').

Figure 8:
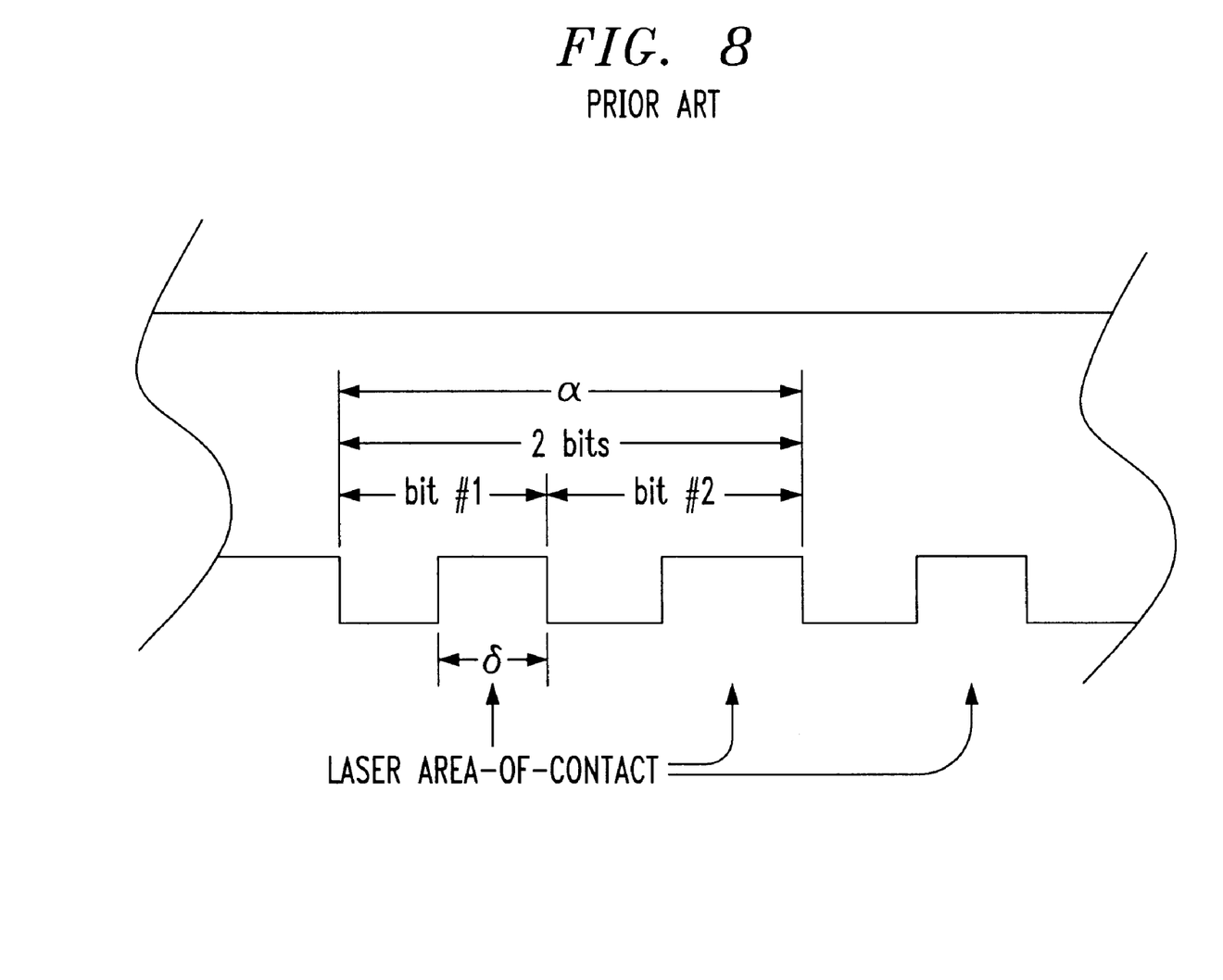
FIG. 8 shows the bit density in a conventional optical disk, wherein each pit represents a single bit.

FIG. 8 shows the bit density in a conventional optical disk, wherein each pit represents a single bit.

More recently, advances have been made in an attempt to increase the density of an optical disk. For instance, more advanced techniques use a variably adjustable depth of a pit or height of a bump to represent a plurality of bits in a digitally encoded signal.

As examples, U.S. Pat. No. 5,724,339 to Ogawa discloses the use of pits having a cross-sectional shape viewed from a direction perpendicular to the laser, selected from at least two different shapes. The different cross-sectional shapes are determined based on an amount of reflected light. U.S. Pat. No. 5,359,591 to Nomoto similarly discloses the use of pits having different cross-sectional shapes, as does U.S. Pat. No. 5,572,508 to Satoh et al. U.S. Pat. No. 5,559,787 uses polarization of reflected light depending upon the depth of the pit to increase data bit density in each pit. U.S. Pat. No. 5,471,455 to Jabr provides a track with a continuous pit having variable depth surface steps, and U.S. Pat. No. 5,577,016 to Inagaki et al. discloses changing the wavelength of a laser depending upon the depth of measured pits.

Unfortunately, the use of different cross-sectional pit shapes with respect to the laser beam, and/or the use of variable-depth pits, requires a complicated laser system which is not only capable of determining whether or not a reflection has been detected from a particular data point, but also which must distinguish between slight differences in reflective qualities.

Other patents, such as U.S. Pat. No. 5,995,481 to Mecca control the depth of pits and/or bumps to be equal to one-half the wavelength of the laser light. General improvements in the quality of reflective properties of pits were disclosed in U.S. Pat. No. 5,696,758 to Yanagimachi et al. U.S. Pat. No. 5,357,499 to Nomoto discloses angling of the bottom of single-bit pits toward the laser.

While these patents disclose improvements which might improve the reliability of reading each pit as a bit, they do not provide a significant increase in the data density of an optical disk.

There is a need for a technique and apparatus for increasing the density of an optical disk without requiring complicated reflection level sensitivity in a laser system otherwise required to measure multiple levels of reflection of a laser beam.

SUMMARY OF THE INVENTION

In accordance with the principles of the present invention, an optical disk comprises a plurality of multi-faceted pits forming a data track. Each multi-faceted pit includes a plurality of facets. Each of the plurality of facets are encoded with a data bit by an angling of the facet with respect to a surface of the optical disk.

An optical disk reading system in accordance with another aspect of the present invention comprises a first laser to present a laser beam to a first facet of each of a plurality of multi-faceted pits of a data track formed in the optical disk. A second laser presents a laser beam to a second facet of each of the plurality of multi-faceted pits of the data track.

An optical disk reading system in accordance with yet another aspect of the present invention comprises a laser having at least two reading positions. A first reading position of the laser presents a laser beam to a first facet of each of a plurality of multi-faceted pits of a data track formed in the optical disk. A second reading position of the laser presents the laser beam to a second facet of each of the plurality of multi-faceted pits of the data track.

An optical disk in accordance with still another aspect of the present invention comprises a plurality of multi-faceted bumps forming a data track. Each multi-faceted bump includes a plurality of facets. Each of the plurality of facets are encoded with a data bit by an angling of the facet with respect to a surface of the optical disk.

A method of reading separate data streams from an optical disk in accordance with still another aspect of the present invention comprises positioning a laser beam to read a status of a first facet of each of a plurality of pits in a track of the optical disk. The laser beam is repositioned to read a status of a second facet of each of the plurality of pits.

A method of reading separate data streams from an optical disk of another aspect reflects a first laser beam from a first facet of each of a plurality of pits in a track of the optical disk to read a first stream of data bits from the plurality of pits. A second laser beam is reflected from a second facet of each of the plurality of pits to read a second stream of data from the plurality of pits.

BRIEF DESCRIPTION OF THE DRAWINGS

Features and advantages of the present invention will become apparent to those skilled in the art from the following description with reference to the drawings, in which:

FIGS. 2A to 2D depict the positioning of two separate laser beams to separately read the individual facets of each pit, in accordance with the principles of the present invention. In particular.

DETAILED DESCRIPTION OF ILLUSTRATIVE EMBODIMENTS

The present invention provides an optical disk with tracks which are formed by multi-faceted pits (and/or bumps) which each contain a plurality of facets.

Each pit (or bump) is multifaceted, i.e., they each have at least two sides, e.g., relatively flat and reflective sides. Each side of the pit (or bump), depending upon its shape, represents either a HIGH bit level, or a LOW bit level.

Each facet of each pit and/or bump is intended for individual read back, either separately as individual 'sides' of the optical disk (much as the much older technology of vinyl records had two 'sides' for separate playback), or substantially simultaneously or serially to provide two bits of data from each pit or bump.

A plurality of laser beams are directed at respective sides of the pit (or bump), one toward a corresponding side of the pit (or bump) on the optical disk to determine a bit condition of each side. The separate facets of the pits or bumps can be read back using the corresponding plurality of laser beams appropriately placed to each measure a reflection or non-reflection of a laser beam from the same facet position of each pit or bump.

Alternatively, a common laser beam can be moveable between positions. A first position places the laser beam in position (e.g., a 0° orientation with respect to the rotation of the track) to measure reflection from a first facet position of each pit or bump as it rotates through a focal point of the laser, and a second position (e.g., a 180° orientation with respect to the rotation of the track) to place the laser beam in an opposite position to measure reflection from a second, opposite facet position of each pit or bump.

Thus, a first 'side' of an optical disk can be played by positioning the laser in a first orientation, and then a second 'side' of the optical disk can be played without removing the optical disk by repositioning the laser in a second orientation.

The technique and apparatus in accordance with the principles of the present invention may be extended to provide a single optical disk and even a single track of the optical disk with even more than two 'sides' by using three-, four- or five-sided pyramidal-shaped pits and/or bumps.

Figure 1A:
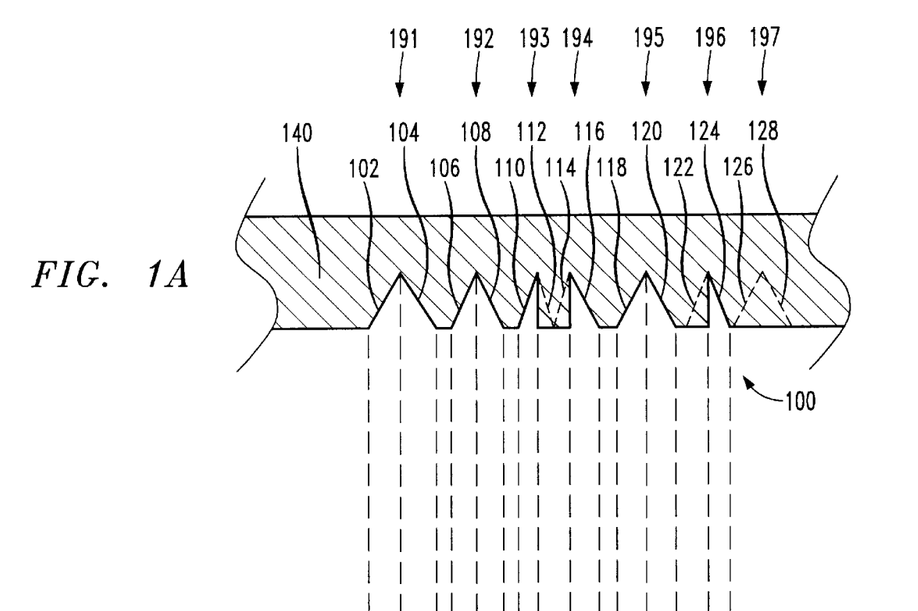
FIG. 1A shows a cross-sectional view of a portion of a track of an optical disk including a plurality of multi-faceted pits, in accordance with the principles of the present invention.
Figure 1B:
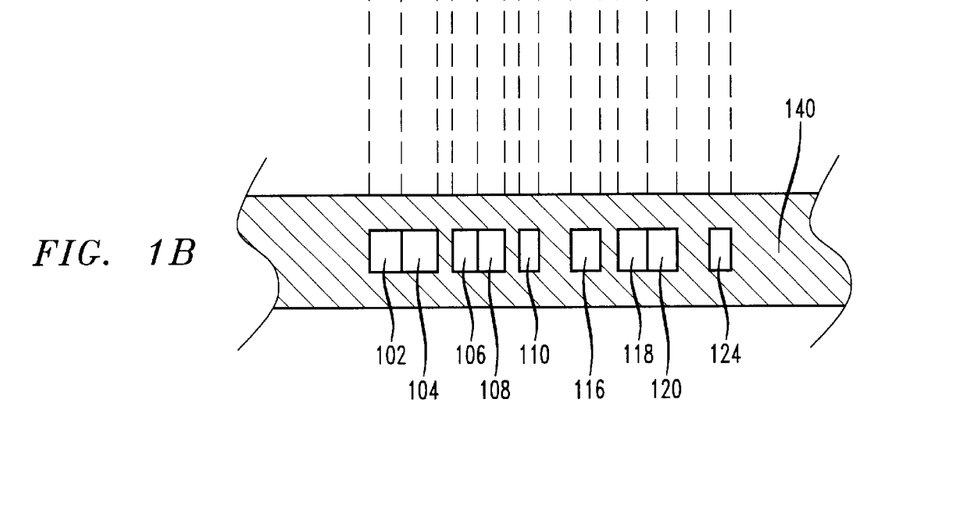
FIG. 1B shows a bottom view of the optical disk shown in FIG. 1A (presuming that the pits open toward the bottom of the optical disk).

FIG. 1A shows a cross-sectional view of a portion of a track of an optical disk including a plurality of multi-faceted pits, in accordance with the principles of the present invention. FIG. 1B shows a bottom view of the optical disk shown in FIG. 1A (presuming that the pits open toward the bottom of the optical disk).

In particular, in FIGS. 1A and 1B, an optical disk 140 includes a track comprising a plurality of multi-faceted pits 191–197. For instance, a first pit 191 is formed by a triangular-shaped pit having two opposing 45° angled facets 102, 104. This pit 191 comprises two bits of data information, e.g., a '00'.

A second pit 192 comprising two similarly angled facets 106, 108 also includes two bits of data information, e.g., a '00'.

The third pit 193 includes a first 45° angled facet 110, but is missing an opposing 45° angled facet and instead includes a 90° facet (i.e., is missing the 45° angled facet). Thus, the third pit 193 indicates, e.g., a '01'.

The fourth pit 194 is missing the first 45° angled facet, but includes the opposing 45° angled facet 116, indicating, e.g., a '10'.

The fifth pit 195 includes both opposing 45° angled facets 118, 120, indicating, e.g., a '00'.

The sixth pit 196 includes only the second 45° angled facet 124, and thus indicates, e.g., a '01'.

The seventh pit 197 shown in FIGS. 1A and 1B is missing both opposing 45° angled facets, indicating, e.g., a '11'.

FIGS. 2A to 2D depict the positioning of two separate laser beams to separately read the individual facets of each multi-faceted pit, in accordance with the principles of the present invention.

Figure 2A:
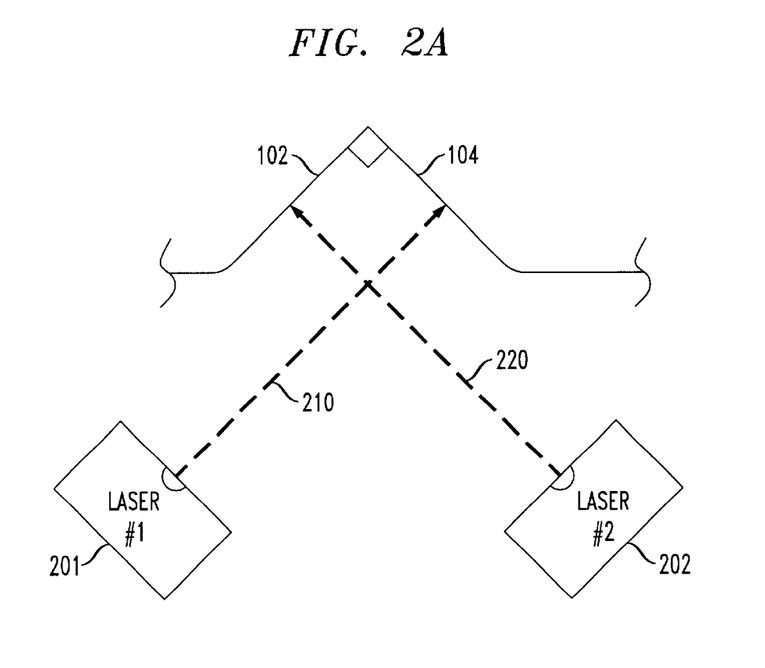
FIG. 2A shows the separate read back of two facets of a multi-faceted pit including both opposing 45° angled facets.

In particular, FIG. 2A shows the separate read back of two facets 102, 104 of a multi-faceted pit including both opposing 45° angled facets 102, 104. The two facets 102, 104 may be simultaneously read by two separate lasers 201, 202 as shown in FIG. 2A. Alternatively, a singular laser beam may be repositioned between the position of the first laser beam 210 and the position of the second laser beam 220 to separately read a stream of data bits (one from each pit) comprised in the first facet 102 of a plurality of multi-faceted pits of a track. Then, at a later time, a second 'side' of the optical disk can be read by reading a stream of data bits (one from each pit) comprised in the second facet 104 of the plurality of multi-faceted pits of a track.

Figure 2B:
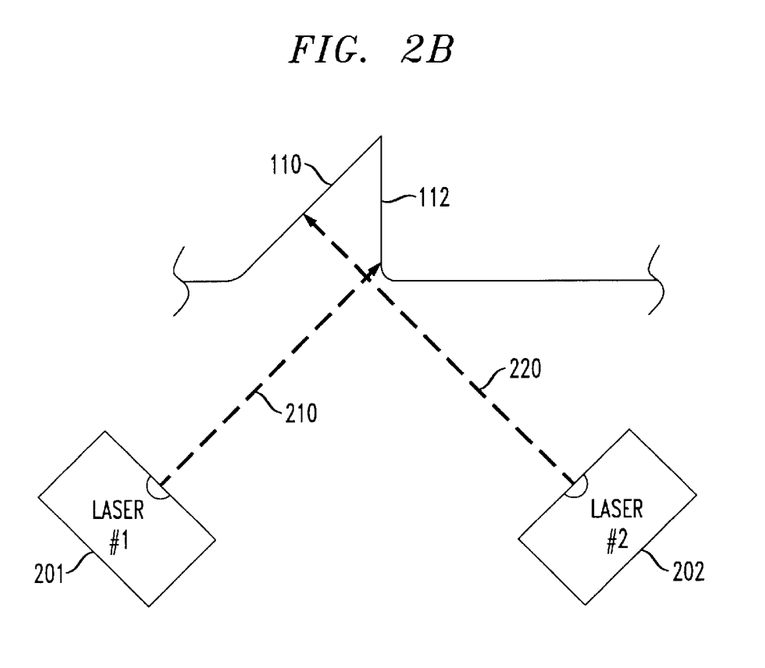
FIG. 2B shows the separate read back of two facets of a multi-faceted pit including only a first 45° angled facet.

FIG. 2B shows the separate read back of two facets 110, 112 of a multi-faceted pit including only a first 45° angled facet 110, and the absence of a second angled facet indicated by the presence of a 90° lip 112.

Figure 2C:
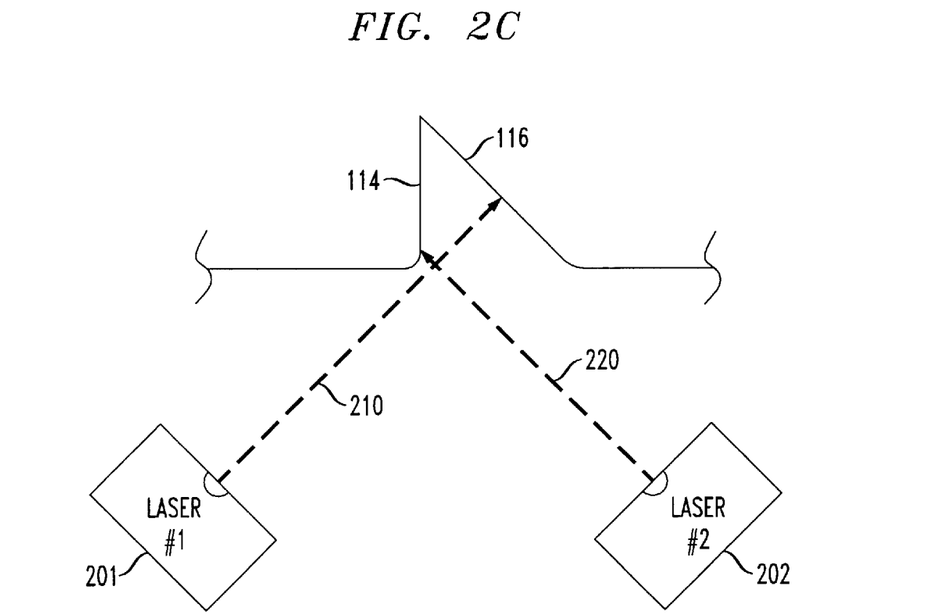
FIG. 2C shows the separate read back of two facets of a multi-faceted pit including only a second 45° angled facet.

FIG. 2C shows the separate read back of two facets 114, 116 of a multi-faceted pit including only a second 45° angled facet 116, and the absence of a first angled facet indicated by the presence of a 90° lip 114.

Figure 2D:
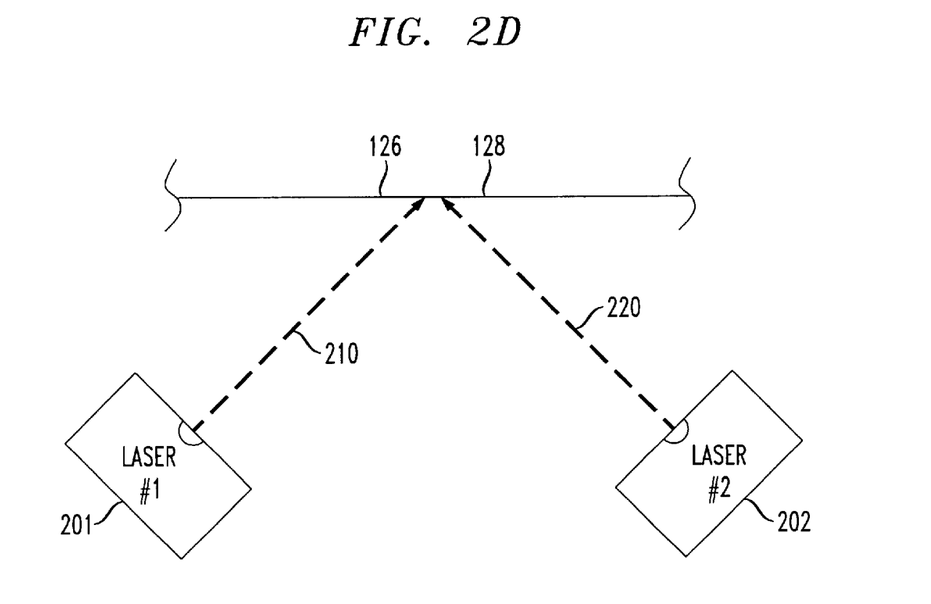
FIG. 2D shows the separate read back of two facets of a multi-faceted pit including neither opposing 45° angled facet.

FIG. 2D shows the separate read back of two facets 126, 128 of a multi-faceted pit including neither opposing 45° angled facet indicated by the presence of essentially no pit.

Note that it is desirable to avoid interference in the reception of a reflected laser beam by the opposing laser because of the approximately 90° relationship between laser beams 210, 220. One technique is to use lasers of differing wavelengths. Another technique is to laterally rotate the laser beams to avoid direct reflections from impinging on the detector of the opposite laser system. Of course, if a single laser beam is used and repositioned for separate read back of only one set of facets (first or second facets) at a time, interference between separate laser systems will not be a design consideration.

Individual bits are encoded two at a time into two-sided triangular-shaped pits or bumps. Thus, two bits are represented within a single pit or on a single bump. In another embodiment, four-sided pyramidal-shaped pits or bumps are used to encode four bits of digital data within each pyramidal-shaped pit or bump. The technique and apparatus can be implemented using three-sided pyramidal-shaped pits or bumps, five-sided pyramidal shaped pits or bumps, etc., allowing a plurality of bits to be represented within each pit or bump. The plurality of bits in each pit or bump are read back by a corresponding number of laser beams.

Thus, with a same density of pits or bumps used in conventional optical disks, twice the amount of information can be contained within an optical disk using two-sided triangular-shaped pits and two laser beams, or even four times the amount of information can be achieved using four-sided pyramidal-shaped pits or bumps.

In accordance with the principles of the present invention, the multiple sides of each pit or bump may be read by separate laser beams either simultaneously, or in quick sequence allowing greater flexibility in placement of the lasers and corresponding optics. Preferably, the laser beams from the plurality of laser beams are arranged non-orthogonal with respect to the surface of the optical disk In another embodiment, an optical disk may be made to have a plurality of 'side' by changing a direction of a laser beam with respect to the rotation of the optical disk.

For instance, a laser beam may be placed in a 0° orientation with respect to the rotation of the track such that a first side of each pit or bump can be read. In this position, the laser beam will be used to read only one side of each pit or bump.

Thereafter, to read a second 'side' of the optical disk, the laser beam is moved to an opposite orientation, e.g., a 180° orientation with respect to the rotation of the track such that a second side of each pit or bump can be read.

Figure 3:
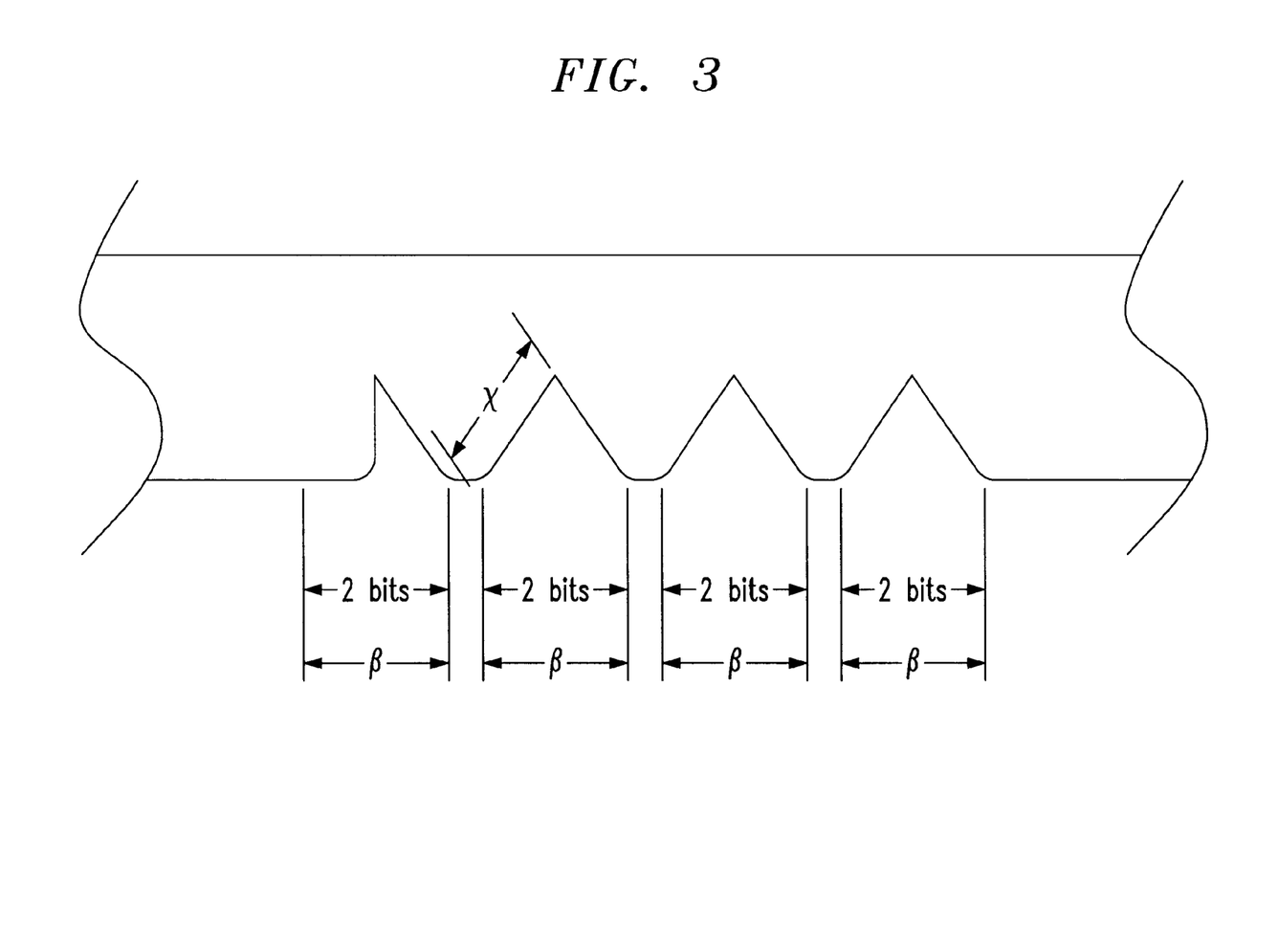
FIG. 3 shows that for the same area of contact of the laser beam on the optical disk, the use of multi-faceted pits and/or bumps can result in marked improvements in data density, e.g., a 141% improvement as compared with certain prior art techniques.

FIG. 3 shows that for the same area of contact of the laser beam on the optical disk, the use of multi-faceted pits and/or bumps can result in marked improvements in data density, e.g., a 141% improvement as compared with certain prior art techniques.

In particular, as shown in FIG. 3, because of the 45° angling of the reflective portion of the pit:

$$\alpha = 4\chi$$
$$\beta = \chi\sqrt{2}$$

According, the single laser embodiment (using only one facet of the multi-faceted pit and a single laser beam) improves data density by 141% as follows:

$$\frac{1}{2}\frac{\alpha}{\beta} \times 100\% \cong 141\%$$

Utilizing the full advantage of the invention by either implementing two laser systems or by implementing a repositionable single laser system, the data density can be improved 282% based on a similarly sized conventional optical disk, shown as follows:

$$\frac{\alpha}{\beta} \times 100\% = \frac{4\chi}{\sqrt{2}\chi} \times 100\% \cong 282\%$$

Figure 4:
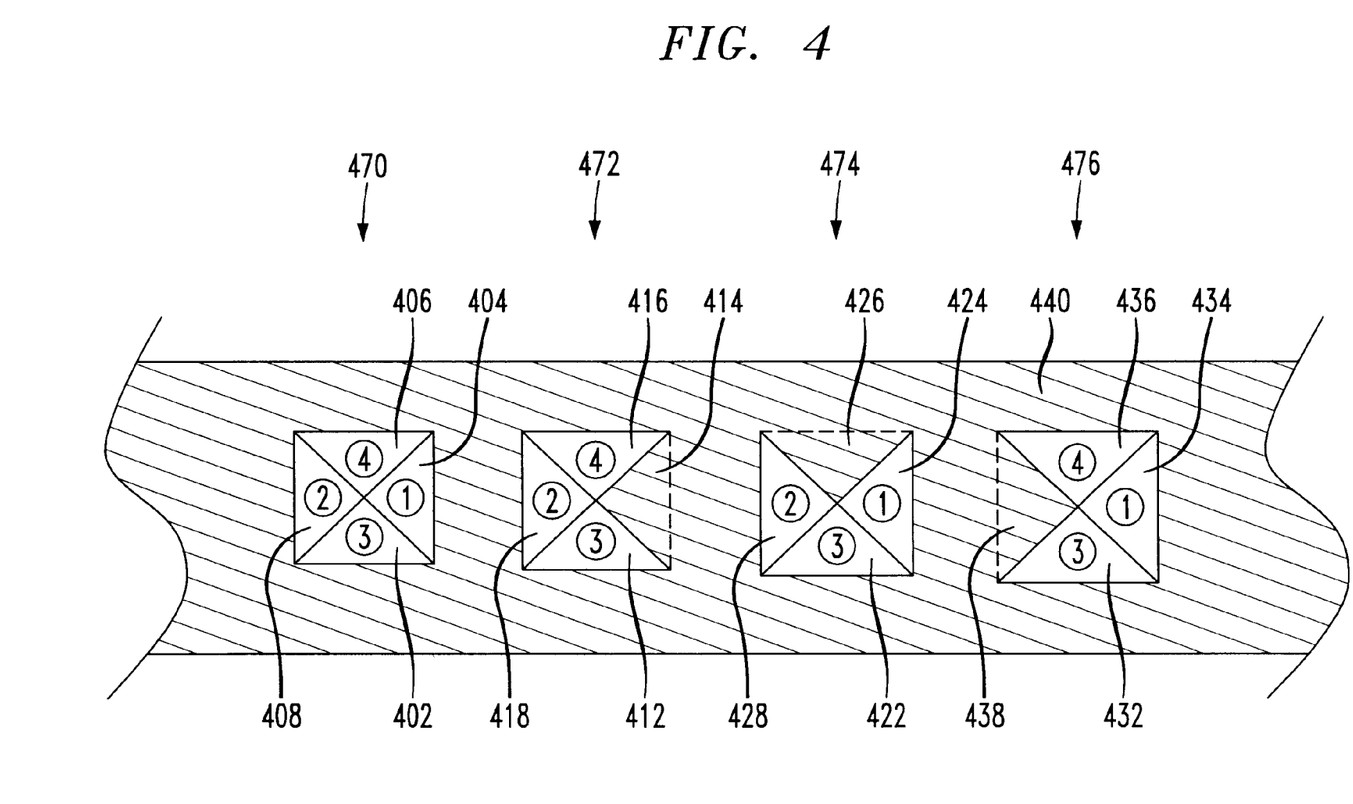
FIG. 4 depicts a track comprising a plurality of multi-faceted pits, each multi-faceted pit having a four-sided pyramidal shape, in accordance with the principles of the present invention.

FIG. 4 depicts a track comprising a plurality of multi-faceted pits 470, 472, 474, 476, each multi-faceted pit 470–476 having a four-sided pyramidal shape, in accordance with the principles of the present invention. While FIG. 4 depicts a four-sided pyramidal shape, the principles of the present invention relate equally to other shaped polygonal pits or bumps, e.g., to three-sided, five-sided, etc. pyramidal shaped pits or bumps.

The presence or formation of a particular facet in any pit represents a particular logic level of a data bit, while the absence of a particular facet in any pit represents the opposite logic level of a data bit. Using a four-sided pyramidal shaped pit, each pit can contain four bits of data (i.e., a half byte, or a nibble).

As shown in FIG. 4, the first pit 470 includes all four facets 402, 404, 406, 408, representing corresponding bits (e.g., a logic '0') of four separate 'sides' of the optical disk. Alternatively, the four facets may represent four bits or a symbol in a serial data stream, e.g., '0000'.

Similarly, as shown in FIG. 4, the second pit 472 does not include a first facet 414, but does include the remaining three facets 416, 418, 412. Thus, the second pit 472 might represent the symbol '1000'. Likewise, the third pit 474 might represent the symbol '0001', and the fourth pit 476 the symbol '0100'.

Figure 5:
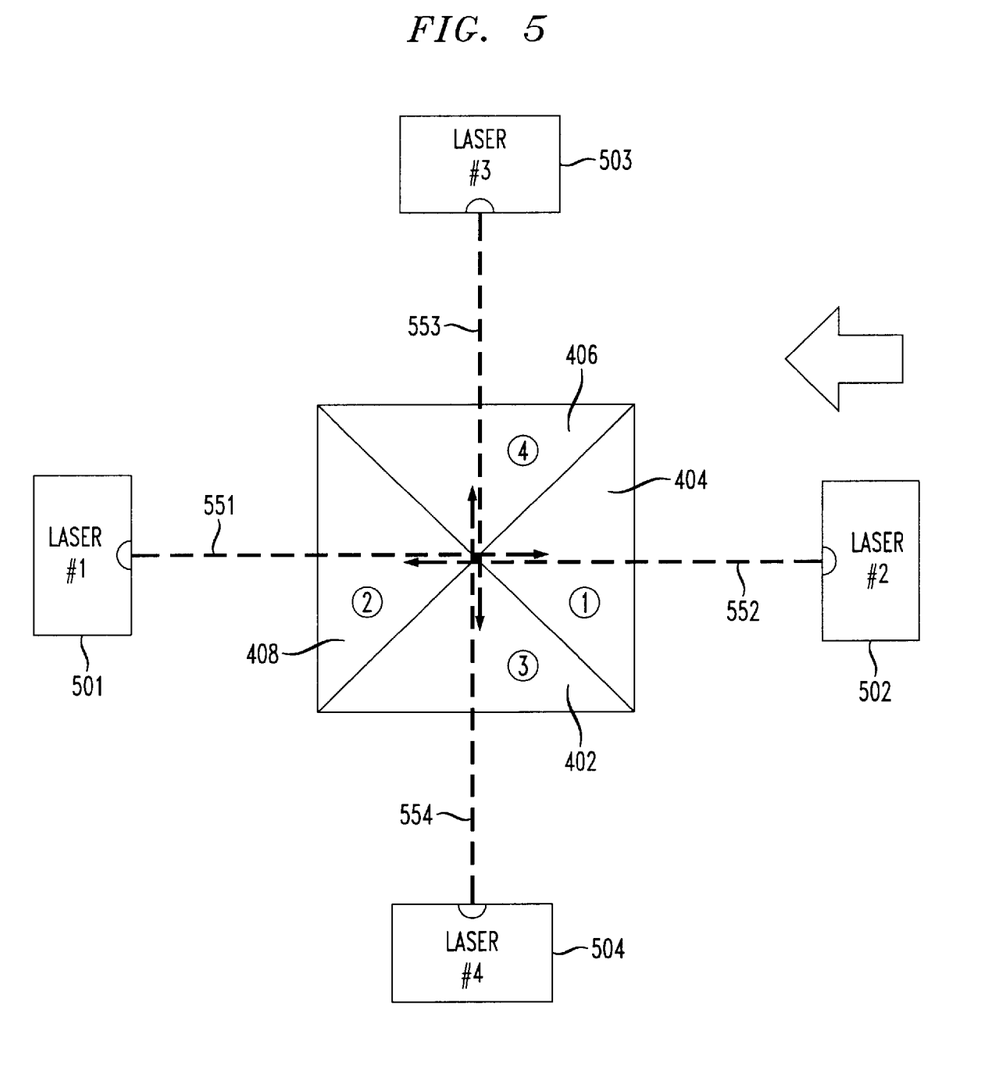
FIG. 5 shows an example embodiment simultaneously positioning four separate lasers having four laser beams adapted to read a reflection or non-reflection from each of four corresponding four facets of a four-sided pyramidal pit, in accordance with the principles of the present invention.

FIG. 5 shows an example embodiment simultaneously positioning four separate lasers 501–504 having four laser beams 551–554 adapted to read a reflection or non-reflection from each of four corresponding four facets 404, 408, 402, 406 of a four-sided pyramidal pit, in accordance with the principles of the present invention.

While the four lasers 501–504 are shown in simultaneous positioning, the principles of the present invention relate equally to any or all of the four lasers 501–504 being positionable in the shown position, with a retreat position allowing operation of the opposing laser. Alternatively, FIG. 5 can be used to depict the approximate orientation of the various lasers 501–504 with respect to the traveling direction of the track of the optical disk, depicted by the arrow in FIG. 5.

If using bump technology, the four laser beams can be arranged to not cross paths. Moreover, it is preferred to angle the facets at 45° with respect to the surface of the optical disk, such that the opposing laser beams will cross orthogonally to one another. To further or alternatively minimize interference between opposing lasers (e.g., between laser #1 and laser #2), lasers of different wavelengths may be implemented.

Note that the distance between any laser and its corresponding facet can be the same for each of the multiple facets of a multiple-facet pit, in accordance with the principles of the present invention.

If a three-sided, four-sided, five-sided, etc. pyramidal pit or bump structure is used in the optical disk, a third, fourth and/or fifth side, respectively, can be read by corresponding re-positioning of the laser beam relative to the side of each pit or bump which is to be read.

Preferably, the shape of each pit or bump will take into account the relationship with the rotation of the track. For instance, when the laser beam is in a 0° or 180° orientation with respect to the rotation of the track, the track will be coming directly at or receding directly from the source of the laser beam, allowing a flat reflective surface to be used as the corresponding side of the pit or bump. However, when the laser beam is in a 90° or 270° orientation to read, e.g., the third and fourth sides of each pit or bump and thus a third and fourth side of the optical disk, the sides may need to be lengthened depending upon the speed of the rotation.

Figure 6:
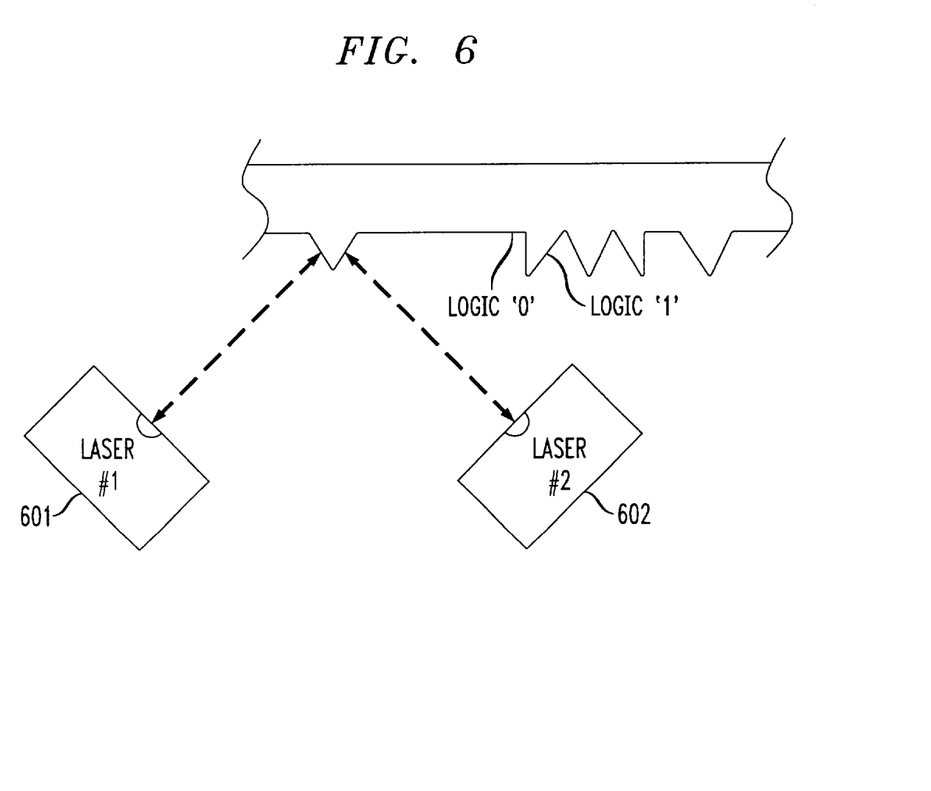
FIG. 6 shows the positioning of two lasers (or the re-positioning of a single laser) to detect the multi-bit information from each multi-faceted bump of a track formed on the surface of an optical disk, in accordance with the principles of the present invention.

FIG. 6 shows the positioning of two lasers (or the re-positioning of a single laser) to detect the multi-bit information from each multi-faceted bump of a track formed on the surface of an optical disk, in accordance with the principles of the present invention.

In particular, in FIG. 6, a first laser 601 is positioned to measure a first facet position of each bump on an optical laser disk 640, while a second laser 602 is positioned to measure a second facet position of each bump on the laser disk.

As shown in FIG. 6, the presence of a 45° angled facet in a particular facet position indicates a particular bit level, e.g., a logic '1', while the absence of the 45° angled facet in the particular facet position indicates the opposite bit level, e.g., a logic '0'.

While the invention has been described with reference to the exemplary embodiments thereof, those skilled in the art will be able to make various modifications to the described embodiments of the invention without departing from the true spirit and scope of the invention.

What is claimed is:

1. An optical disk having a generally planar surface, comprising:
   a plurality of multi-faceted irregularities forming a data track on said planar surface; and
   a plurality of facets in each multi-faceted irregularities, each of said plurality of facets being encoded with a data bit by an angling of said facet with respect to a surface of said optical disk;
   wherein each of said multi-faceted irregularities includes at least two facets.

2. The optical disk having a generally planar surface according to claim 1, wherein:
   each of said plurality of multi-faceted irregularities comprises a pit.

3. The optical disk having a generally planar surface according to claim 1, wherein:
   each of said plurality of multi-faceted irregularities comprises a bump.

4. The optical disk having a generally planar surface according to claim 1, wherein:
   said plurality of multi-faceted irregularities are regularly spaced along said data track.

5. The optical disk having a generally planar surface according to claim 1, wherein:
   each of said plurality of irregularities contains at least two data bits of information.

6. The optical disk having a generally planar surface according to claim 1, wherein:
   said optical disk is a compact disk (CD).

7. The optical disk having a generally planar surface according to claim 1, wherein:
   said optical disk is a digital video disk (DVD).

8. An optical disk having a generally planar surface, comprising:
   a plurality of multi-faceted irregularities forming a data track on said planar surface; and
   a plurality of facets in each multi-faceted irregularities, each of said plurality of facets being encoded with a data bit by an angling of said facet with respect to a surface of said optical disk;
   wherein each of said plurality of facets is adapted for reflection of a separate laser beam.

9. The optical disk having a generally planar surface according to claim 8, wherein:
   each of said laser beams impinge said irregularity from a different angle.

10. An optical disk having a generally planar surface, comprising:
    a plurality of multi-faceted irregularities forming a data track on said planar surface; and
    a plurality of facets in each multi-faceted irregularities, each of said plurality of facets being encoded with a data bit by an angling of said facet with respect to a surface of said optical disk;
    wherein each of said multi-faceted pits includes at least four facets.

11. An optical disk reading system, comprising:
    a first laser to present a laser beam to a first facet of each of a plurality of multi-faceted pits of a data track formed in said optical disk; and
    a second laser to present a laser beam to a second facet of each of said plurality of multi-faceted pits of said data track.

12. The optical disk reading system according to claim 11, wherein:
    said first laser and said second laser are adapted to present said respective laser beams to each of said plurality of multi-faceted pits substantially simultaneously.

13. The optical disk reading system according to claim 11, wherein:
    said first laser and said second laser are adapted to present said respective laser beams to each of said plurality of multi-faceted pits substantially serially.

14. The optical disk reading system according to claim 11, wherein:
    said first laser is a substantially same distance from said first facet as said second laser is from said second facet.

15. An optical disk reading system, comprising:
    a laser having at least two reading positions;
    a first reading position of said laser being adapted for presenting a laser beam to a first facet of each of a plurality of multi-faceted pits of a data track formed in said optical disk, said laser beam impinging said first facet from a first angle; and
    a second reading position of said laser being adapted for presenting said laser beam to a second facet of each of said plurality of multi-faceted pits of said data track, said laser beam impinging said second facet from a second angle different from said first angle.

16. The optical disk reading system according to claim 15, wherein:
    said laser in said first reading position reads a first stream of data from said plurality of multi-faceted pits; and
    said laser in said second position reads a second stream of data from said plurality of multi-faceted pits.

17. An optical disk, comprising:
    a plurality of multi-faceted bumps forming a data track; and
    a plurality of facets on each multi-faceted bump, each of said plurality of facets being encoded with a data bit by an angling of said facet with respect to a surface of said optical disk;
    wherein each of said plurality of facets are adapted for reflection of a separate laser beams.

18. An optical disk, comprising:
    a plurality of multi-faceted bumps forming a data track; and
    a plurality of facets on each multi-faceted bump, each of said plurality of facets being encoded with a data bit by an angling of said facet with respect to a surface of said optical disk;
    wherein each of said laser beams impinge said bump from a different angle.

19. The optical disk according to claim 18, wherein:
    each of said plurality of bumps contain at least two data bits of information.

20. The optical disk according to claim 18, wherein:
said optical disk is a compact disk (CD).

21. The optical disk according to claim 18, wherein:
said optical disk is a digital video disk (DVD).

22. A method of reading separate data streams from an optical disk, comprising:

positioning a laser beam to read a status of a first facet of each of a plurality of pits in a track of said optical disk; and repositioning said laser beam to read a status of a second facet of each of said plurality of pits.

23. The method of reading separate data streams from an optical disk according to claim 22, wherein:
said status read by said laser beam relates to an angle of said first facet.

24. A method of reading separate data streams from an optical disk, comprising:

reflecting a first laser beam from a first facet of each of a plurality of pits in a track of said optical disk to read a first stream of data bits from said plurality of pits; and reflecting a second laser beam from a second facet of each of said plurality of pits to read a second stream of data from said plurality of pits.

25. Apparatus for reading separate data streams from an optical disk, comprising:

means for positioning a laser beam to read a status of a first facet of each of a plurality of pits in a track of said optical disk; and means for repositioning said laser beam to read a status of a second facet of each of said plurality of pits.

26. The apparatus for reading separate data streams from an optical disk according to claim 25, wherein:
said status read by said laser beam relates to an angle of said first facet.

27. Apparatus for reading separate data streams from an optical disk, comprising:

means for reflecting a first laser beam from a first facet of each of a plurality of pits in a track of said optical disk to read a first stream of data bits from said plurality of pits; and means for reflecting a second laser beam from a second facet of each of said plurality of pits to read a second stream of data from said plurality of pits.

28. A method of reading separate data streams from an optical disk, comprising:

providing a first laser beam to read a status of a first facet of each of a plurality of pits in a track of said optical disk, said first facet of each of said plurality of pits comprising a first data stream of said optical disk; and providing a second laser beam to read a status of a second facet of each of said plurality of pits, said second facet of each of said plurality of pits comprising a second data stream of said optical disk.

* * * * *